United States Patent
Watson et al.

(10) Patent No.: US 9,712,580 B2
(45) Date of Patent: Jul. 18, 2017

(54) PIPELINING FOR PARALLEL NETWORK CONNECTIONS TO TRANSMIT A DIGITAL CONTENT STREAM

(75) Inventors: Mark Watson, San Francisco, CA (US); Wei Wei, Fremont, CA (US); Bin Wang, Fremont, CA (US)

(73) Assignee: NETFLIX, INC., Los Gatos, CA (US)

( * ) Notice: Subject to any disclaimer, the term of this patent is extended or adjusted under 35 U.S.C. 154(b) by 454 days.

(21) Appl. No.: 13/438,789

(22) Filed: Apr. 3, 2012

(65) Prior Publication Data
US 2013/0262625 A1 Oct. 3, 2013

(51) Int. Cl.
G06F 15/16 (2006.01)
H04L 29/06 (2006.01)
H04N 21/647 (2011.01)

(52) U.S. Cl.
CPC ...... *H04L 65/4069* (2013.01); *H04L 65/4084* (2013.01); *H04L 65/608* (2013.01); *H04L 65/80* (2013.01); *H04L 69/14* (2013.01); *H04N 21/64776* (2013.01)

(58) Field of Classification Search
CPC ............... H04L 1/0052; H04L 49/1546; H04L 49/3063; H04L 2209/125
USPC ........................................................ 709/217
See application file for complete search history.

(56) References Cited

U.S. PATENT DOCUMENTS

| | | | |
|---|---|---|---|
| 4,474,049 A * | 10/1984 | Hansen .................. | E21B 43/34 73/1.34 |
| 7,100,195 B1 * | 8/2006 | Underwood .......... | G06F 9/4443 707/999.009 |
| 7,437,614 B2 * | 10/2008 | Haswell .............. | G06F 11/3684 714/38.13 |
| 7,921,217 B2 | 4/2011 | Yan et al. | |
| 2002/0194351 A1 | 12/2002 | Nishimura et al. | |
| 2004/0199574 A1 | 10/2004 | Franco et al. | |
| 2004/0243714 A1 * | 12/2004 | Wynn ..................... | H04L 67/42 709/231 |
| 2006/0253204 A1 * | 11/2006 | Papanikolaou ..... | G06F 17/5045 700/1 |

(Continued)

OTHER PUBLICATIONS

International Search Report PCT/US13/034974 dated Jun. 10, 2013.
European Search Report dated Nov. 27, 2015 in Application No. 13771866.4.

*Primary Examiner* — Kevin Bates
*Assistant Examiner* — S M Rahman
(74) *Attorney, Agent, or Firm* — Artegis Law Group, LLP (57) ABSTRACT

One embodiment of the present invention sets forth a technique for transmitting a digital content stream through a network between at least one content server and a content player. The method includes communicating with the at least one content server to set up a plurality of parallel network connections on the network to transmit the digital content stream. The method further includes sending a first data request and a second data request within a first time limit via at least one tested network connection in the plurality of parallel network connections to evaluate whether pipelining of the digital content stream is possible for the at least one tested network connection. The method also includes utilizing pipelining to transmit the digital content stream over the at least one tested network connection based on a first response to the first data request and a second response to the second data request.

29 Claims, 5 Drawing Sheets

(56) References Cited

U.S. PATENT DOCUMENTS

| | | |
|---|---|---|
| 2007/0260546 A1 | 11/2007 | Batalden et al. |
| 2009/0028585 A1* | 1/2009 | Guo ........................ B41J 2/155 399/15 |
| 2010/0223357 A1 | 9/2010 | Elnarsson et al. |
| 2011/0119323 A1* | 5/2011 | Tani et al. .................... 709/203 |
| 2011/0225302 A1 | 9/2011 | Park et al. |

* cited by examiner

PIPELINING FOR PARALLEL NETWORK CONNECTIONS TO TRANSMIT A DIGITAL CONTENT STREAM

BACKGROUND OF THE INVENTION

Field of the Invention

Embodiments of the present invention relate generally to digital content delivery techniques and, more specifically, pipelining for parallel network connections to transmit a digital content stream.

Description of the Related Art

A digital content stream may be transmitted to an end point device over a single network connection. The rate at which the digital content stream can be transmitted over the single network connection may be negatively affected by poor network conditions, causing the playback of the digital content stream on the end point device to be delayed or even prevented. Accordingly, what is needed in the art is an approach for transmitting a digital content stream at improved transmission rates.

SUMMARY OF THE INVENTION

In one embodiment, a method of a digital content stream through a network between at least one content server and a content player is provided. The method includes communicating with the at least one content server to set up a plurality of parallel network connections on the network between the at least one content server and the content player to transmit the digital content stream. The method further includes sending a first data request and a second data request within a first time limit via at least one tested network connection in the plurality of parallel network connections to evaluate whether pipelining of the digital content stream is possible for the at least one tested network connection. The method also includes utilizing pipelining to transmit the digital content stream over the at least one tested network connection based on a first response to the first data request and a second response to the second data request.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
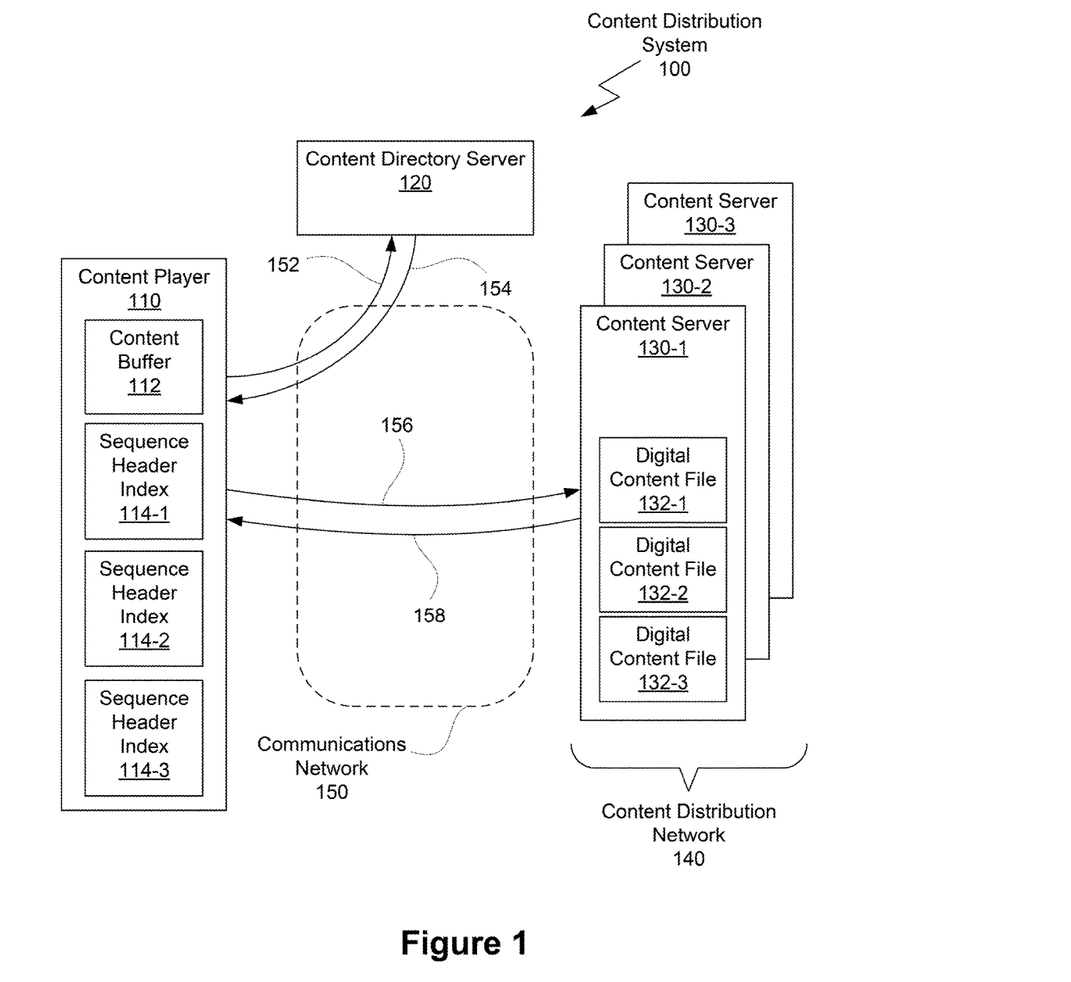
FIG. 1 illustrates a content distribution system configured to implement one or more aspects of the present invention.

FIG. 1 illustrates a content distribution system 100 configured to implement one or more aspects of the present invention. As shown, the content distribution system 100 includes, without limitation, a content player 110, one or more content servers 130, and a communications network 150. The content distribution system 100 may also include a content directory server 120. In one embodiment, the one or more content servers 130 comprise a content distribution network (CDN) 140.

The communications network 150 includes a plurality of network communications systems, such as routers and switches, configured to facilitate data communication between the content player 110 and the one or more content servers 130. Persons skilled in the art will recognize that many technically feasible techniques exist for building the communications network 150, including technologies practiced in deploying the well-known internet communications network. A network connection may broadly refer to a communications channel between two devices that are connected to the communications network 150.

The content directory server 120 comprises a computer system configured to receive a title lookup request 152 and generate file location data 154. The title lookup request 152 includes, without limitation, a name of a movie or song requested by a user. The content directory server 120 queries a database (not shown) that maps a video stream of a given title encoded at a particular playback bit rate to a digital content file 132, residing within an associated content server 130. The file location data 154 includes, without limitation, a reference to a content server 130 that is configured to provide the digital content file 132 to the content player 110 (e.g., through one or more network connections). Multiple content servers 130 (e.g., content server 130-1, content server 130-2, content server 130-3, etc.) may each have a copy of the digital content file 132 and may each be configured to provide the portions of the file simultaneously to the same content player 110 using the communications network 150.

The content server 130 is a computer system configured to serve download requests for digital content files 132 from the content player 110. The digital content files may reside on a mass storage system accessible to the computer system. The mass storage system may include, without limitation, direct attached storage, network attached file storage, or network attached block-level storage. The digital content files 132 may be formatted and stored on the mass storage system using any technically feasible technique. A data transfer protocol, such as the well-known hyper-text transfer protocol (HTTP), may be used to download digital content files 132 from the content server 130 to the content player 110.

Each title (a movie, song, or other form of digital media) is associated with one or more digital content files 132. Each digital content file 132 comprises, without limitation, a sequence header index 114, audio data and an encoded sequence. An encoded sequence comprises a complete version of the video data corresponding title encoded to a particular playback bit rate. For example, a given title may be associated with digital content file 132-1, digital content file 132-2, and digital content file 132-3. Digital content file 132-1 may comprise sequence header index 114-1 and an encoded sequence encoded to an average playback bit rate of approximately 250 kilobits per second (Kbps). Digital content file 132-2 may comprise sequence header index 114-2 and an encoded sequence encoded to an average playback bit rate of approximately 1000 Kbps. Similarly, digital content file 132-3 may comprise sequence header index 114-3 and an encoded sequence encoded to an average playback bit rate of approximately 1500 Kbps. The 1500 Kbps encoded sequence enables higher quality playback and is therefore more desirable for playback versus the 250 Kbps encoded sequence. Given that multiple content servers 130 (e.g., content server 130-1, content server 130-2, content server 130-3, etc.) may each have a copy of the digital content file 132, each of the multiple content servers 130 may therefore have the digital content file 132-1, digital content file 132-2, and digital content file 132-3, etc.

An encoded sequence within a digital content file 132 is organized as units of video data representing a fixed span of playback time. Overall playback time is organized into sequential time slots, each corresponding to one fixed span of playback time. For a given time slot, one unit of video data is represented within the digital content file 132 for the playback bit rate associated with the digital content file 132. Because variable bit rate encoding may be used, each unit of video data may be variable in size, despite a direct correspondence to the fixed span of playback time. For the above example, each time slot within the digital content file 132-1 comprising an encoded sequence encoded to a playback bit rate of 1500 Kbps would include a unit of video data encoded at 1500 Kbps. In one embodiment, units of audio data are encoded at a fixed bit rate for each time slot and stored in the digital content file 132.

Figure 2:
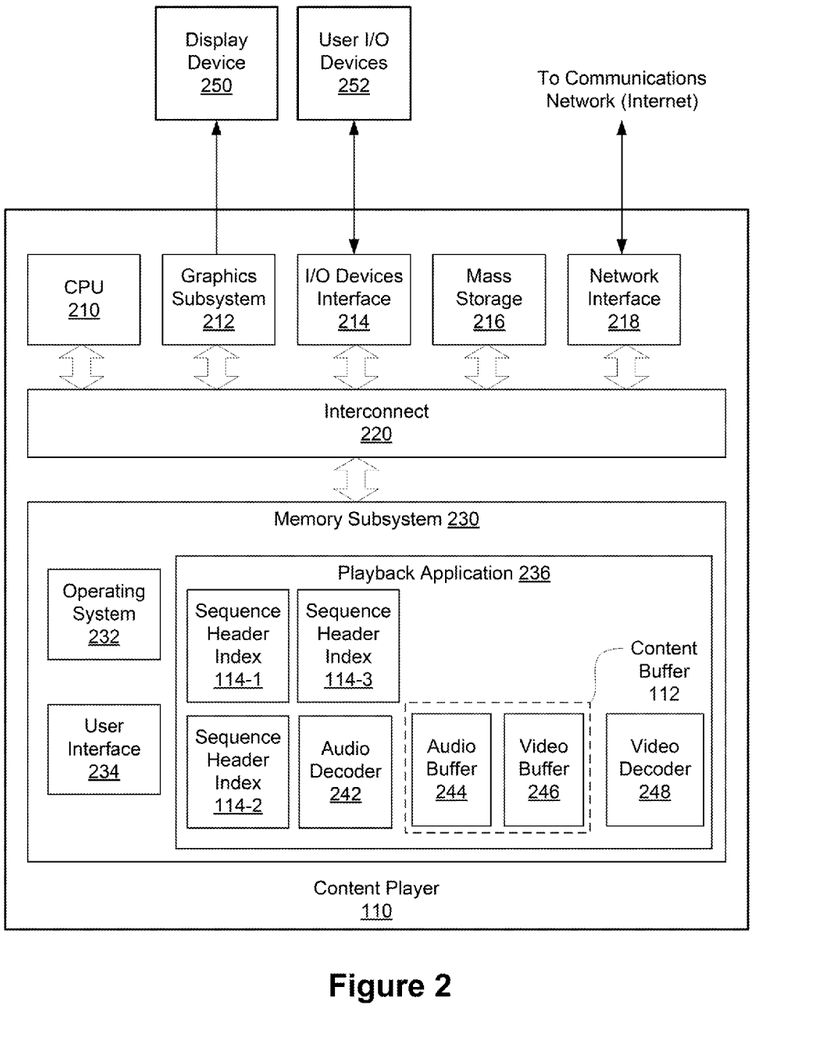
FIG. 2 is a more detailed view of the content player of FIG. 1, according to one embodiment of the invention.

The units of video data and units of audio data are configured to provide time-synchronized playback, beginning at the start of each time slot. To avoid starving either audio playback or video playback, units of audio data and units of video data are downloaded in a generally alternating pattern to assure that the audio buffer 244 and video buffer 246 store comparable durations of playback time each.

Persons skilled in the art will readily recognize that each encoded sequence, as defined above, comprises a digital content "stream." Furthermore, the process of downloading a particular encoded sequence from the content server 130 to the content player 110 comprises "streaming" the digital content to the content player 110 for playback at a particular playback bit rate.

The content player 110 may comprise a computer system, a set top box, a mobile device such as a mobile phone, or any other technically feasible computing platform that has network connectivity and is coupled to or includes a display device and speaker device for presenting video frames, and generating acoustic output, respectively. As described in greater detail below, the content player 110 is configured to download a unit of video data for a selected bit rate, and adapt the selected bit rate for subsequently downloaded units of video data based on prevailing bandwidth conditions within the communications network 150.

As available bandwidth within the communications network 150 becomes limited, the content player may select a lower bit rate encoding for units of video data that have not yet been downloaded corresponding to subsequent time slots. As available bandwidth increases, a higher bit rate encoding may be selected.

Although, in the above description, the content distribution system 100 is shown with one content player 110 and one CDN 140, persons skilled in the art will recognize that the architecture of FIG. 1 contemplates only an exemplary embodiment of the invention. Other embodiments may include any number of content players 110 and/or CDNs 140. Thus, FIG. 1 is in no way intended to limit the scope of the present invention in any way.

FIG. 2 is a more detailed view of the content player 110 of FIG. 1, according to one embodiment of the invention. As shown, the content player 110 includes, without limitation, a central processing unit (CPU) 210, a graphics subsystem 212, an input/output (I/O) device interface 214, a network interface 218, an interconnect 220, and a memory subsystem 230. The content player 110 may also include a mass storage unit 216.

The CPU 210 is configured to retrieve and execute programming instructions stored in the memory subsystem 230. Similarly, the CPU 210 is configured to store and retrieve application data residing in the memory subsystem 230. The interconnect 220 is configured to facilitate transmission of data, such as programming instructions and application data, between the CPU 210, graphics subsystem 212, I/O devices interface 214, mass storage 216, network interface 218, and memory subsystem 230.

The graphics subsystem 212 is configured to generate frames of video data and transmit the frames of video data to display device 250. In one embodiment, the graphics subsystem 212 may be integrated into an integrated circuit, along with the CPU 210. The display device 250 may comprise any technically feasible means for generating an image for display. For example, the display device 250 may be fabricated using liquid crystal display (LCD) technology, cathode-ray technology, and light-emitting diode (LED) display technology (either organic or inorganic). An input/output (I/O) device interface 214 is configured to receive input data from user I/O devices 252 and transmit the input data to the CPU 210 via the interconnect 220. For example, user I/O devices 252 may comprise one of more buttons, a keyboard, and a mouse or other pointing device. The I/O device interface 214 also includes an audio output unit configured to generate an electrical audio output signal. User I/O devices 252 includes a speaker configured to generate an acoustic output in response to the electrical audio output signal. In alternative embodiments, the display device 250 may include the speaker. A television is an example of a device known in the art that can display video frames and generate an acoustic output. A mass storage unit 216, such as a hard disk drive or flash memory storage drive, is configured to store non-volatile data. A network interface 218 is configured to transmit and receive packets of data via the communications network 150. In one embodiment, the network interface 218 is configured to communicate using the well-known Ethernet standard. The network interface 218 is coupled to the CPU 210 via the interconnect 220.

The memory subsystem 230 includes programming instructions and data that comprise an operating system 232, user interface 234, and playback application 236. The operating system 232 performs system management functions such as managing hardware devices including the network interface 218, mass storage unit 216, I/O device interface 214, and graphics subsystem 212. The operating system 232 also provides process and memory management models for the user interface 234 and the playback application 236. The user interface 234 provides a specific structure, such as a window and object metaphor, for user interaction with content player 110. Persons skilled in the art will recognize the various operating systems and user interfaces that are well-known in the art and suitable for incorporation into the content player 110.

The playback application 236 is configured to retrieve a digital content file 132 from a content server 130 via the network interface 218 and play the digital content file 132 through the graphics subsystem 212. The graphics subsystem 212 is configured to transmit a rendered video signal to the display device 250. In normal operation, the playback application 236 receives a request from a user to play a specific title. The playback application 236 then locates the digital content files 132 associated with the requested title, where each digital content file 132 associated with the requested title includes an encoded sequence encoded to a different playback bit rate. In one embodiment, the playback application 236 locates the digital content files 132 by posting title lookup request 152 to the content directory server 120. The content directory server 120 replies to the title lookup request 152 with file location data 154 for each digital content file 132 associated with the requested title. Each file location data 154 includes a reference to the associated content server 130, in which the requested digital content file 132 resides. The title lookup request 152 may include the name of the requested title, or other identifying information with respect to the title. After the playback application 236 has located the digital content files 132 associated with the requested title, the playback application 236 downloads sequence header indices 114 associated with each digital content file 132 associated with the requested title from the content server 130.

In one embodiment, the playback application 236 begins downloading the digital content file 132 associated with the requested title comprising the encoded sequence encoded to the lowest playback bit rate to minimize startup time for playback. For the purposes of discussion only, the digital content file 132-1 is associated with the requested title and comprises the encoded sequence encoded to the lowest playback bit rate. The requested digital content file 132-1 is downloaded into the content buffer 112, configured to server as a first-in, first-out queue. In one embodiment, each unit of downloaded data comprises a unit of video data or a unit of audio data. As units of video data associated with the requested digital content file 132-1 are downloaded to the content player 110, the units of video data are pushed into the content buffer 112. Similarly, as units of audio data associated with the requested digital content file 132-1 are downloaded to the content player 110, the units of audio data are pushed into the content buffer 112. In one embodiment the units of video data are stored in video buffer 246 within the content buffer 112, and units of audio data are stored in audio buffer 224, also within the content buffer 112.

A video decoder 248 reads units of video data from the video buffer 246, and renders the units of video data into a sequence of video frames corresponding in duration to the fixed span of playback time. Reading a unit of video data from the video buffer 246 effectively de-queues the unit of video data from the video buffer 246 (and from the content buffer 112). The sequence of video frames is processed by graphics subsystem 212 and transmitted to the display device 250.

An audio decoder 242 reads units of audio data from the audio buffer 244, and renders the units of audio data into a sequence of audio samples, generally synchronized in time with the sequence of video frames. In one embodiment, the sequence of audio samples is transmitted to the I/O device interface 214, which converts the sequence of audio samples into the electrical audio signal. The electrical audio signal is transmitted to the speaker within the user I/O devices 252, which, in response, generates an acoustic output.

When playback is initiated, the playback application 236 requests units of video data encoded to the lowest available bit rate, thereby minimizing start time perceived by a user. However, as bandwidth conditions within the communications network 150 allow, the playback application 236 may request units of video data encoded to higher bit rates, thereby improving playback quality over time, without introducing a startup delay commensurate with the highest level of playback quality ultimately achieved by the playback application 236. If bandwidth conditions within the communications network 150 deteriorate during playback, then the playback application 236 may request subsequent units of video data encoded to a lower bit rate. In one embodiment, the playback application 236 determines which encoded bit rate should be used for each sequential download of a unit of video data based on a bandwidth estimate calculated over one or more recently downloaded units of video data.

Figure 3:
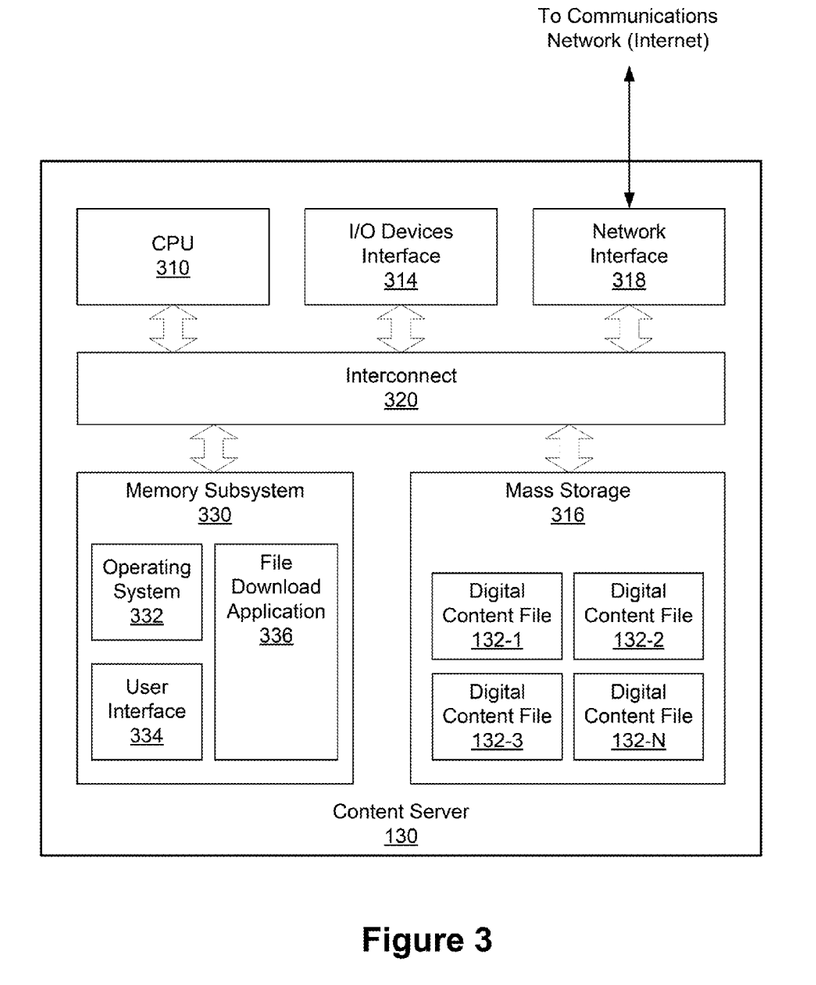
FIG. 3 is a more detailed view of the content server of FIG. 1, according to one embodiment of the invention.

FIG. 3 is a more detailed view of the content server 130 of FIG. 1, according to one embodiment of the invention. The content server 130 includes, without limitation, a central processing unit (CPU) 310, a network interface 318, an interconnect 320, a memory subsystem 330, and a mass storage unit 316. The content server 130 may also include an I/O devices interface 314.

The CPU 310 is configured to retrieve and execute programming instructions stored in the memory subsystem 330. Similarly, the CPU 310 is configured to store and retrieve application data residing in the memory subsystem 330. The interconnect 320 is configured to facilitate transmission of data, such as programming instructions and application data, between the CPU 310, I/O devices interface 314, mass storage unit 316, network interface 318, and memory subsystem 330.

The mass storage unit 316 stores digital content files 132-1 through 132-N. The digital content files 132 may be stored using any technically feasible file system on any technically feasible media. For example the mass storage unit 316 may comprise a redundant array of independent disks (RAID) system incorporating a conventional file system.

The memory subsystem 330 includes programming instructions and data that comprise an operating system 332, a user interface 334, and a file download application 336. The operating system 332 performs system management functions such as managing hardware devices including the network interface 318, mass storage unit 316, and I/O devices interface 314. The operating system 332 also provides process and memory management models for the user interface 334 and the file download application 336. The user interface 334 provides a specific structure, such as a window and an object metaphor or a command line interface, for user interaction with content server 130. A user may employ the user interface 334 to manage functions of the content server. In one embodiment, the user interface 334 presents a management web page for managing operation of the content server 130. Persons skilled in the art will recognize the various operating systems and user interfaces that are well-known in the art and suitable for incorporation into the content player 130.

The file download application 336 is configured to facilitate the transmission of digital content files 132-1 to 132-N, to the content player 110, via a file download operation or set of operations. The downloaded digital content file 132 is transmitted through network interface 318 to the content player 110 via the communications network 150. In one embodiment, file contents of each digital content file 132 may be accessed in an arbitrary sequence (known in the art as "random access"). As previously described herein, each digital content file 132 includes a sequence header index 114 and an encoded sequence. An encoded sequence comprises a full version of a given movie or song encoded to a particular bit rate, and video data associated with the encoded sequence is divided into units of video data. Each unit of video data corresponds to a specific span of playback time and begins with a frame including a sequence header specifying the size and the resolution of the video data stored in the unit of video data.

In an embodiment, multiple parallel network connections may be set up and/or operated to each transmit a part of the video stream over a network. In conjunction with FIG. 1, the multiple parallel network connections may connect the content player 110 to one or more content servers 130, each having the digital content file 132. For example, suppose a dropped packet is detected on one of the multiple parallel network connections. In accordance with the TCP protocol, the packet rate for that particular network connection may be dropped in response to the dropped packet, while the remaining network connections may continue operating at their respective packet rates without any reduction.

Using parallel network connections may decrease startup time and/or increase the amount of data transmitted during the startup time. For example, in accordance with the TCP protocol, a network connection may be established with a slow startup packet rate (e.g., a packet rate used to start transmitting data for a network connection), and gradually increase the packet rate after each round trip time period. Using multiple connections may allow a greater amount of data to be transmitted during the start up phase than with a single connection while the packet rate of each of the multiple connections is being gradually increased after each round trip time period.

Using parallel network connections may further improve the packet rate for transmitting a video stream in accordance with the TCP protocol. To illustrate, if one network connection is allocated for transmitting a video stream, and another network connection is allocated for downloading a file, then the available bandwidth may be divided equally between the two network connections. On the other hand, if multiple (e.g., two) parallel network connections are allocated for transmitting a video stream, and one network connection is allocated for downloading a file, then the video stream may be allocated more (e.g., twice as much) bandwidth as the file download, resulting in an improved packet rate for transmitting the video stream.

In an embodiment, pipelining may be used to transmit a video stream. Pipelining for a network connection may correspond to a process of sending multiple requests to transmit data on the network connection without waiting to receive a response for each of such requests before sending a subsequent request. Pipelining may improve data transmission rates, since gaps in time between requests may be reduced or eliminated. Pipelining may also reduce the number of TCP packets to be sent over a network and may thus reduce network load.

A network may or may not support pipelining. Parallel network connections used to transmit a video stream without pipelining may encounter idle periods between sending requests and receiving responses to the requests. These idle periods may cause instability in a rate control algorithm that manages requests for the parallel network connections, which may result in packet bursts that can overflow a buffer. If pipelining is used on one or more network paths that don't support pipelining, the connections may be closed immediately or after a delay. Although connections may be reopened, time and computing resources may be used that would not have been if the connection had remained open.

The number of closed connections may be compared to a predetermined number. If the number of closed connections is higher than the predetermined number (e.g., an anticipated number of closed connections), then pipelining may be determined not to be supported. If the number is lower, then pipelining may still be supported. In some embodiments, the average number of successful requests per connection may be evaluated to determine whether pipelining is supported. If the average number of requests per connection is below a threshold anticipated number, this may be an indication that pipelining is not supported. For example, a CDN may permit approximately 100 successful requests per connection. If the average number of successful requests per connection is lower than 10 and is not caused by deliberate closure of the connection, the system may determine that pipelining is not supported for the path of the evaluated connection.

In an embodiment, whether support exists for pipelining may be tested by sending a first pair of requests for one or more of the parallel network connections. Throughout this disclosure, each of the parallel network connections used to transmit a pair of requests for testing purposes is broadly referred to as a tested network connection. The requests for each of the tested network connections may be sent back to back (e.g., within a predetermined time period, without intervening requests being sent or responses being received). In addition, the requests may be sent in the same or different packets. The responses to the first pair of requests may indicate whether pipelining is supported, possibly supported, or not supported for the corresponding network connection. Some example responses are illustrated in the table below.

TABLE 1

| 1st Request Response/ 2nd Request Response | Timeout | Protocol Error | Connection Reset | HTTP 1.0 Response | 2/3/4XX Responses | 5XX Responses |
|---|---|---|---|---|---|---|
| Timeout | Maybe | n/a | n/a | n/a | n/a | n/a |
| Protocol Error | n/a | No | n/a | n/a | n/a | n/a |
| Connection Reset | n/a | n/a | Maybe | n/a | n/a | n/a |
| HTTP 1.0 Response | No | No | No | No | No | No |
| 2/3/4XX Responses | No | No | Maybe | No | Yes | No |
| 5XX Responses | No | No | No | No | No | No |

As illustrated in Table 1 above, the responses to each of the first and second requests may be a timeout, a protocol error, a connection reset, or a response such as a status code. Depending on the responses to the first request and the second request, pipelining may be determined to be supported, possibly supported, or not supported. For example, if the first request response and the second request response both correspond to a predetermined status code (e.g., "2/3/4XX Responses" in Table 1), then pipelining is supported. If the first request response and the second request response both correspond to "Timeout" in Table 1, then pipelining may possibly be supported. If the first request response corresponds to "Connection Reset" in Table 1 and the second request response corresponds to "HTTP 1.0 Response" in Table 1, then pipelining is not supported.

Moreover, if pipelining is possibly supported, a third request and a fourth request may be sent to obtain a second result. Based on the combination of the first result and the second result, a determination may be made as to whether pipelining is supported as shown in Table 2 below.

TABLE 2

| First Result | Second Result | Conclusion |
|---|---|---|
| No | — | No |
| Yes | — | Yes |
| Maybe | Yes | Yes |
| Maybe | Maybe | No |
| Maybe | No | No |

Figure 4:
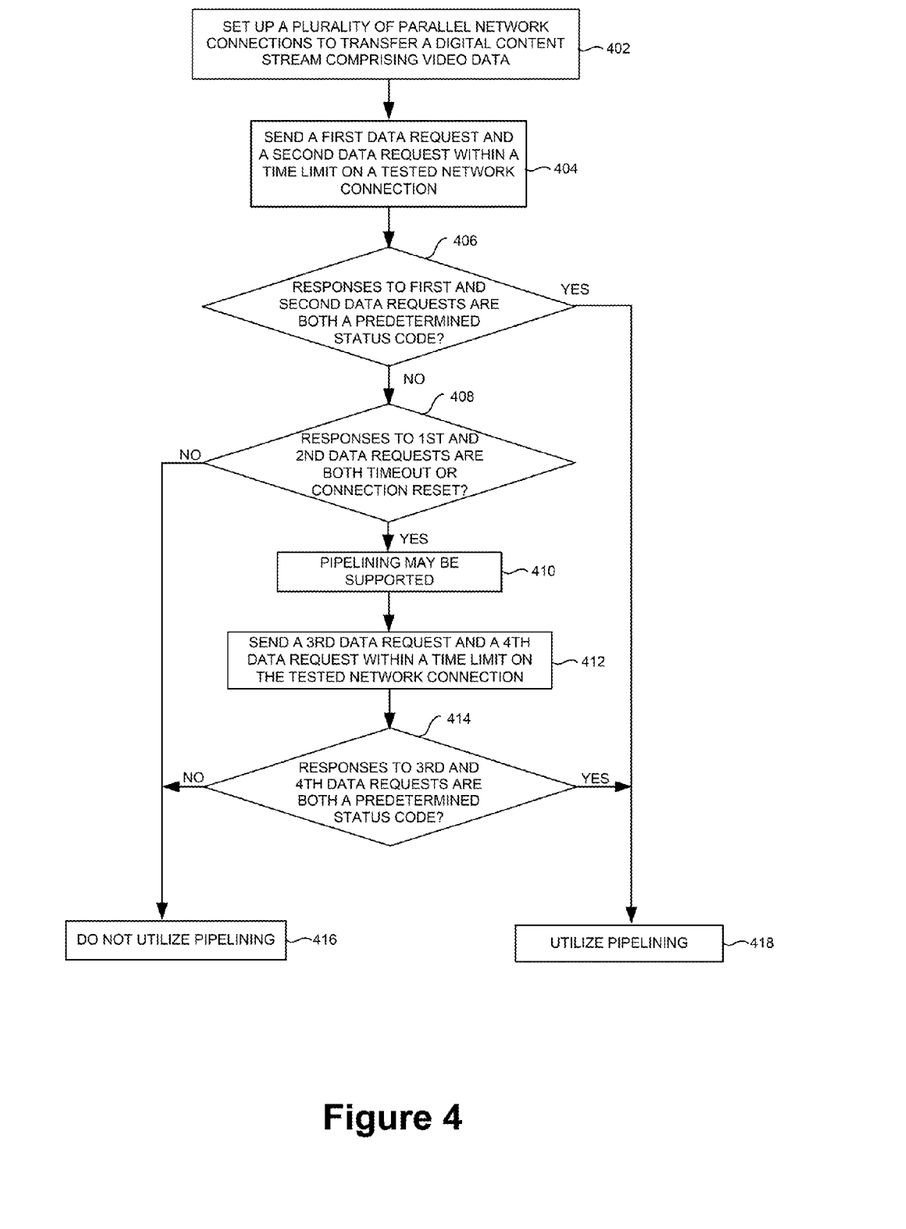
FIG. 4 is a flow diagram of method steps for utilizing pipelining for parallel network connections to transmit a digital content stream, according to one embodiment of the invention.

FIG. 4 is a flow diagram of method steps for utilizing pipelining for parallel network connections to transmit a digital content stream, according to one embodiment of the invention. The method steps may each be performed by the CPU 210 of the content player 110 of FIGS. 1 and 2. In other embodiments, some or all of the operations may be performed by the CPU 310 of the content server 130, or by another processor of a different machine that affects transmission between the content server 130 and the content player 110. In other words, the content player 110 or the content server 130 may perform all of the method steps, or the content player 110 and the content server 130 may cooperate to perform the steps outlined in FIG. 4.

In operation 402, a plurality of network connections are set up to transmit a digital content stream comprising video data. For example, the content player 110 may establish a plurality of network connections between the content player 110 and the content server 130 via the communications network 150. In operation 404, the content player 110 may send a first data request and a second data request within a time limit (e.g., a first time limit) on a tested network connection. If the responses to the first and second request are a predetermined status code (e.g., "2/3/4xx Responses" in Table 1), then pipelining is supported, and the flow proceeds to operation 418, in which pipelining is utilized by the content player 110 to transmit digital content between the content player 110 and the content server 130 over the communications network 150.

If the responses to the requests from the content player 110 are not the predetermined status code, then the flow proceeds to operation 408. In operation 408, if both responses to the requests from the content player 110 are a timeout or a connection reset, then the flow proceeds to operation 410, in which pipelining is possibly supported. In another embodiment, operation 408 may further include evaluating whether one response is a timeout, and the other response is one of the predetermined status codes (e.g., "2/3/4xx Responses" in Table 1), which may also indicate that pipelining may be supported. If the condition of operation 408 is not satisfied, the flow proceeds to operation 416, in which pipelining is not utilized by the content player 110 to transmit digital content between the content player 110 and the content server 130 over the communications network 150.

After operation 410, in operation 412, a third data request and a fourth data request by the content player 110 are sent within a time limit (e.g., a second time limit, where the second time limit may be the same or different from the first time limit) on the tested network connection. After operation 412, in operation 414, the responses to the third and fourth data requests from the content player 110 are evaluated to determine whether the responses are both one of the predetermined status codes. The responses to the third and fourth data requests may be the same or different ones of the predetermined status codes. If operation 414 is satisfied, then pipelining is supported and the flow proceeds to operation 418, in which pipelining is utilized by the content player 110 to transmit digital content between the content player 110 and the content server 130 over the communications network 150. If operation 414 is not satisfied, the flow proceeds to operation 416, and pipelining is not supported and therefore is not utilized for the plurality of parallel network connections to transmit a digital content stream comprising video data.

It should be apparent to a person of skills in the art to recognize that the operations illustrated in FIG. 4 and described above may be performed in different sequences and/or by a different system. For instance, a server (e.g., the server 130), instead of the content player 110, may be configured to determine whether pipelining is supported on a tested network connection and utilize pipelining for the transmission of a digital content stream.

Figure 5:
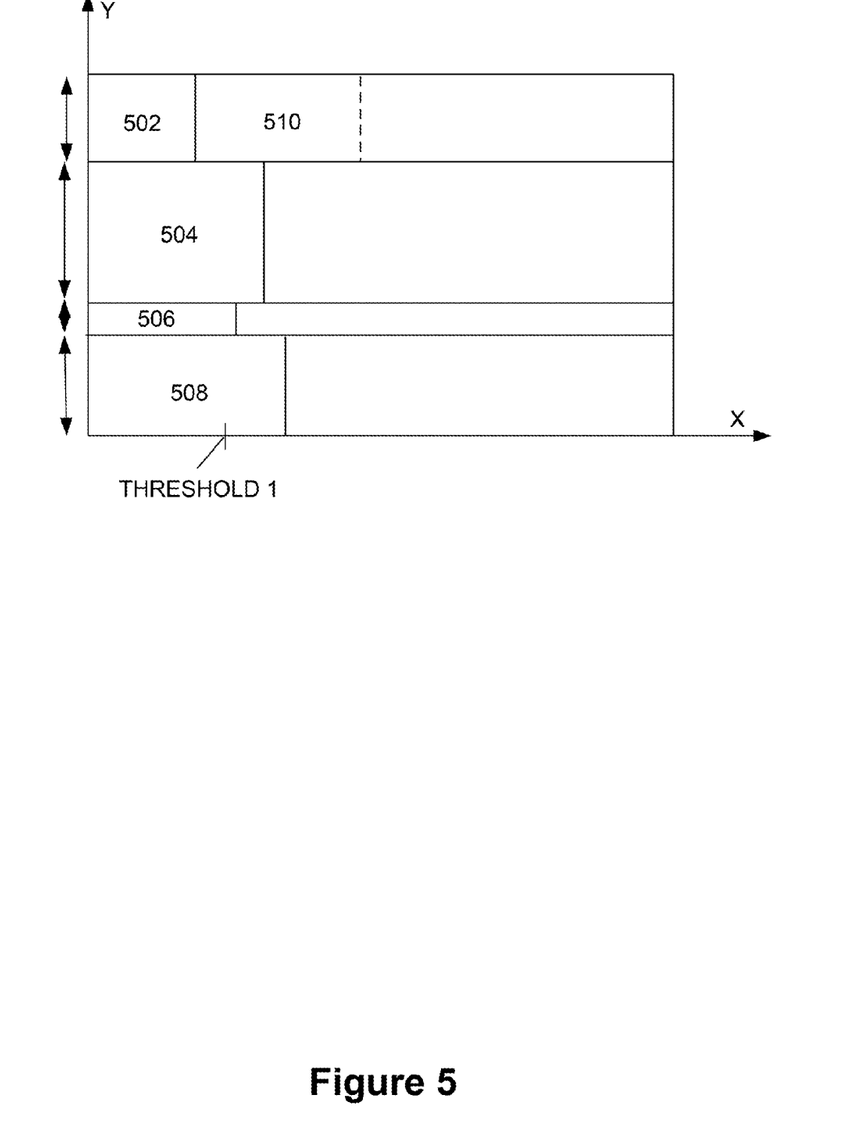
FIG. 5 is an illustration of requesting additional data for a network connection, according to one embodiment of the invention.

FIG. 5 is an illustration of requesting additional data for a network connection, such as one of several parallel network connections, according to one embodiment of the invention. The X axis is a measurement in time, and the Y axis indicates a rate of data transmission. Pending data to be transmitted for each parallel network connection is shown as items 502, 504, 506, and 508. If the pending amount of data falls below a first threshold, additional data may be requested as indicated by item 510. The same threshold may be used for each of the parallel network connections, which may help to distribute the requests across the parallel network connections. The use of the threshold may further assist with allowing each of the parallel connections to finish transmitting data within a transmission time limit.

In some embodiments, the system may choose to send out a new pipelined request when the bytes remaining to be received on a connection divided by the data rate of the connection is less than max(<first fixed value>, <first fixed multiple of the HTTP response time>). The max( ) function may output the largest value contained within the parentheses, and the fixed value may be a predetermined number. The use of the max( ) function with both the fixed value and the fixed multiple of the HTTP response time may provide more accurate results than if only a fixed multiple of the round trip time is used without the fixed value. Given that the round trip time may be much shorter than the HTTP response time, using only the round trip time may result in a connection that often falls idle.

In some embodiments, each request may be for a selected number of bytes that has been calculated such that the number of bytes remaining to be received for each connection is the connection data rate multiplied by max(<second fixed value>, <fixed multiple of the round trip time>). The second fixed value may be a predetermined value that is different from the first fixed value. Although a pre-defined unit or block may be requested, calculating a quantity of bytes to request may permit the system to have finer grained control over how much data is requested, which may permit the system to have greater efficiency and/or faster data transfer.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A method for utilizing pipelining to transmit a digital content stream through a network between at least one content server and a content player, the method comprising:
communicating with the at least one content server to set up a plurality of parallel network connections on the network between the at least one content server and the content player to transmit the digital content stream
sending a first data request and a second data request within a first time limit via at least one tested network connection in the plurality of parallel network connections to evaluate whether pipelining the digital content stream is possible for the at least one tested network connection;
determining whether responses to the first data request and the second data request are both predetermined status codes; and
if the responses are both predetermined status codes, then pipelining is supported, and utilizing pipelining to transmit the digital content stream over the at least one tested network connection based on a first response to the first data request and a second response to the second data request, and
if the responses are not both predetermined status codes, then sending a third data request and a fourth data request within a second time limit via the at least one tested network connection to further evaluate whether pipelining the digital content stream is possible for the at least one tested network condition.

2. The method of claim 1, further comprising:
determining that responses to the third data request and the fourth data request are both predetermined status codes and that pipelining is supported when oth the first response and the second response comprise one of a timeout or a connection reset.

3. The method of claim 1, further comprising:
determining that responses to the third data request and the fourth data request are both predetermined status codes and that pipelining is supported when the first response comprises a connection reset and the second response comprises a predetermined status code.

4. The method of claim 1, further comprising:
determining that pipelining the digital content stream is supported for the at least one tested network condition when responses to the third data request and the fourth data request are both predetermined status codes.

5. The method of claim 1, further comprising:
receiving a first part of the digital content stream from a first server via one or more of the parallel network connections set up with the first server; and
receiving a second part of the digital content stream from a second server via one or more of the parallel network connections set up with the second server.

6. The method of claim 1, further comprising:
requesting a quantity of additional data associated with the digital content stream to be transmitted when a pending quantity of data to be transmitted via at least one of the plurality of parallel network connections is below a threshold.

7. The method of claim 6, further comprising:
receiving the quantity of additional data, wherein the quantity is a function of the data rate and the pending quantity of data.

8. The method of claim 1, further comprising:
identifying a quantity of closed network connections in the plurality of parallel network connections; and
determining that pipelining may be possible when the quantity of closed network connections is lower than an anticipated number.

9. The method of claim 1, further comprising:
identifying an average number of successful requests for at least one tested connection in the plurality of parallel network connections; and
determining that pipelining may be possible for the at least one tested network connection where the average number of successful requests is greater than a predetermined threshold.

10. The method of claim 1, further comprising:
sending a new pipelined request via at least one of the parallel connections when the bytes remaining to be received on the at least one of the parallel connections divided by the data rate of the connection is less than the maximum of a first fixed value and a first fixed multiple of an HTTP response time for the at least one of the parallel connections.

11. The method of claim 1, wherein each request via at least one of the parallel connections is for a selected number of bytes that has been calculated such that the number of bytes remaining to be received for each of the at least one of the parallel connections is the connection data rate multiplied by the maximum of a predetermined number and a fixed multiple of a round trip time.

12. The method of claim 1, wherein both of the first data request and the second data request indicate that a particular type of data should be returned.

13. The method of claim 12, wherein the particular type of data comprises video data.

14. A non-transitory computer-readable storage medium including instructions that, when executed by a processor, cause the processor to utilize pipelining to transmit a digital content stream through a network between at least one content server and a content player, the operations comprising:
communicating with the at least one content server to set up a plurality of parallel network connections on the network between the at least one content server and the content player to transmit the digital content stream
sending a first data request and a second data request within a first time limit via at least one tested network connection in the plurality of parallel network connections to evaluate whether pipelining the digital content stream is possible for the at least one tested network connection;
determining whether responses to the first data request and the second data request are both predetermined status codes; and
if the responses are both predetermined status codes, then pipelining is supported, and utilizing pipelining to transmit the digital content stream over the at least one tested network connection based on a first response to the first data request and a second response to the second data request, and
if the responses are not both predetermined status codes, then sending a third data request and a fourth data request within a second time limit via the at least one tested network connection to further evaluate whether pipelining the digital content stream is possible for the at least one tested network condition.

15. The non-transitory computer-readable storage medium of claim 14, further comprising:
determining that responses to the third data request and the fourth data request are both predetermined status codes and that pipelining is supported when both the first response and the second response comprise one of a timeout or a connection reset.

16. The non-transitory computer-readable storage medium of claim 14, further comprising:
determining that responses to the third data request and the fourth data request are both predetermined status codes and that pipelining is supported when the first response comprises a connection reset and the second response comprises a predetermined status code.

17. The non-transitory computer-readable storage medium of claim 14, further comprising:
determining that pipelining the digital content stream is supported for the at least one tested network condition when responses to the third data request and the fourth data request are both predetermined status codes.

18. The non-transitory computer-readable storage medium of claim 14, further comprising:
receiving a first part of the digital content stream from a first server via one or more of the parallel network connections set up with the first server; and
receiving a second part of the digital content stream from a second server via one or more of the parallel network connections set up with the second server.

19. The non-transitory computer-readable storage medium of claim 14, further comprising:
requesting a quantity of additional data associated with the digital content stream to be transmitted when a pending quantity of data to be transmitted via at least one of the plurality of parallel network connections is below a threshold.

20. The non-transitory computer-readable storage medium of claim 19, further comprising:
receiving the quantity of additional data, wherein the quantity is a function of the data rate and the pending quantity of data.

21. The non-transitory computer-readable medium of claim 14, wherein both of the first data request and the second data request indicate that a particular type of data should be returned.

22. The non-transitory computer-readable medium of claim 21, wherein the particular type of data comprises video data.

23. A system for transmitting a digital content stream including video data through a network, the system comprising:
a memory; and
a processor coupled to the memory, the processor being configured to
communicate with at least one content server to set up a plurality of parallel network connections on the network between the at least one content server and the system to transmit the digital content stream;
send a first data request and a second data request within a first time limit via at least one tested network connection in the plurality of parallel network connections to evaluate whether pipelining the digital content stream is possible for the at least one tested network connection;
determine whether responses to the first data request and the second data request are both predetermined status codes; and
if the responses are both predetermined status codes, then pipelining is supported, and utilize pipelining to transmit the digital content stream over the at least one tested network connection based on a first response to the first data request and a second response to the second data request, and
if the responses are not both predetermined status codes, then send a third data request and a fourth data request within a second time limit via the at least one tested network connection to further evaluate whether pipelining the digital content stream is possible for the at least one tested network condition.

24. The system of claim 23, wherein the processor is further configured to:
determine that pipelining the digital content stream is supported for the at least one tested network condition when responses to the third data request and the fourth data request are both predetermined status codes.

25. The system of claim 23, wherein the processor is further configured to:
receive a first part of the digital content stream from a first server via one or more of the parallel network connections set up with the first server; and
receive a second part of the digital content stream from a second server via one or more of the parallel network connections set up with the second server.

26. The system of claim 23, wherein both of the first data request and the second data request indicate that a particular type of data should be returned.

27. The system of claim 26, wherein the particular type of data comprises video data.

28. The system of claim 23, wherein the processor is further configured to determine that responses to the third data request and the fourth data request are both predetermined status codes and that pipelining is supported when both the first response and the second response comprise one of a timeout or a connection reset.

29. The system of claim 23, wherein the processor is further configured to determine that responses to the third data request and the fourth data request are both predetermined status codes and that pipelining is supported when the first response comprises a connection reset and the second response comprises a predetermined status code.

* * * * *

UNITED STATES PATENT AND TRADEMARK OFFICE
CERTIFICATE OF CORRECTION

PATENT NO. : 9,712,580 B2  
APPLICATION NO. : 13/438789  
DATED : July 18, 2017  
INVENTOR(S) : Mark Watson et al.

Page 1 of 1

It is certified that error appears in the above-identified patent and that said Letters Patent is hereby corrected as shown below:

In the Claims

Column 11, Claim 2, Line 56, please delete "oth" and insert --both--.

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*